US009729032B2

(12) United States Patent
Barton

(10) Patent No.: US 9,729,032 B2
(45) Date of Patent: Aug. 8, 2017

(54) LIMITING RADIAL EXPANSION IN ROTOR BALANCING

(71) Applicant: Tesla Motors, Inc., Palo Alto, CA (US)

(72) Inventor: Augusto E. Barton, Palo Alto, CA (US)

(73) Assignee: TESLA, INC., Palo Alto, CA (US)

( * ) Notice: Subject to any disclaimer, the term of this patent is extended or adjusted under 35 U.S.C. 154(b) by 655 days.

(21) Appl. No.: 13/919,585

(22) Filed: Jun. 17, 2013

(65) Prior Publication Data
US 2014/0368082 A1 Dec. 18, 2014

(51) Int. Cl.
*H02K 7/04* (2006.01)
*H02K 15/16* (2006.01)
*H02K 17/16* (2006.01)

(52) U.S. Cl.
CPC ............. *H02K 15/165* (2013.01); *H02K 7/04* (2013.01); *H02K 17/165* (2013.01); *Y10T 29/49012* (2015.01)

(58) Field of Classification Search
CPC ............. H02K 15/0012; H02K 17/165; H02K 15/0081; H02K 17/16; H02K 3/48; H02K 3/46; H02K 7/04; H02K 15/165; Y10T 29/49012
USPC ............... 310/261.1, 216.121, 216.114, 411, 310/156.22, 156.28, 156.53, 156.56, 310/156.78, 156.81, 211, 212, 400, 410, 310/216.116; 29/596, 598
(Continued)

(56) References Cited

U.S. PATENT DOCUMENTS

| 374,728 A | * | 12/1887 | Bliss | ..................... H02K 15/12 220/3.7 |
| 2,461,566 A | * | 2/1949 | Morrill | ............... H02K 17/165 310/156.76 |

(Continued)

FOREIGN PATENT DOCUMENTS

| JP | 2001341052 A | * | 12/2001 | |
| WO | 2007057412 A1 | | 5/2007 | |

OTHER PUBLICATIONS

"The Effect of Temperature", Michael Sepe, Plastics Technology, Aug. 2011.*

(Continued)

*Primary Examiner* — John K Kim
(74) *Attorney, Agent, or Firm* — Garlick & Markison; Bruce E. Garlick

(57) ABSTRACT

A rotor including: a shaft; a structure comprising at least one end ring and rotor bars, wherein at least the end ring comprises a material subject to expansion or movement radially outward from the shaft upon a rotor balancing process that involves spinning of the structure; a core that at least partially encloses the rotor bars; and means for limiting the expansion or movement of the structure radially outward. A method including: providing a structure comprising at least one end ring and rotor bars, wherein at least the end ring comprises a material subject to expansion or movement radially outward from the shaft upon spinning of the structure; assembling a rotor from the structure and a core, the core at least partially enclosing the rotor bars; spinning the rotor in a rotor balancing process; and limiting the expansion or movement of the structure radially outward in the rotor balancing process.

20 Claims, 3 Drawing Sheets

(58) Field of Classification Search
IPC .............................. H02K 3/46,3/48, 15/16, 7/04
See application file for complete search history.

(56) References Cited

U.S. PATENT DOCUMENTS

| | | | | |
|---|---|---|---|---|
| 4,064,410 | A * | 12/1977 | Roach ........................... | 310/211 |
| 4,309,635 | A * | 1/1982 | Sei ....................... | H02K 17/165 |
| | | | | 310/125 |
| 4,476,736 | A * | 10/1984 | Hershberger ........ | H02K 1/2766 |
| | | | | 68/23.7 |
| 4,954,736 | A * | 9/1990 | Kawamoto ............ | H02K 1/278 |
| | | | | 310/156.21 |
| 5,444,319 | A * | 8/1995 | Nakamura et al. ........... | 310/211 |
| 5,563,463 | A * | 10/1996 | Stark ................... | H01F 41/0253 |
| | | | | 29/598 |
| 5,886,443 | A | 3/1999 | Dymond et al. | |
| 6,177,750 | B1 * | 1/2001 | Tompkin ................ | 310/216.114 |
| 7,741,750 | B1 | 6/2010 | Tang | |
| 8,154,167 | B2 | 4/2012 | Tang | |
| 2001/0017499 | A1 * | 8/2001 | Kaneko ................ | H02K 1/2766 |
| | | | | 310/156.38 |
| 2006/0186751 | A1 * | 8/2006 | Kim ....................... | H02K 1/278 |
| | | | | 310/156.44 |
| 2007/0126304 | A1 * | 6/2007 | Ito ........................ | H02K 1/2766 |
| | | | | 310/156.53 |
| 2007/0296298 | A1 * | 12/2007 | Jones ..................... | H02K 1/278 |
| | | | | 310/179 |
| 2008/0122298 | A1 * | 5/2008 | Roberts .................. | H02K 53/00 |
| | | | | 310/1 |
| 2009/0284094 | A1 * | 11/2009 | Horng ...................... | H02K 1/30 |
| | | | | 310/156.22 |
| 2010/0052454 | A1 * | 3/2010 | Lin ....................... | H02K 1/2786 |
| | | | | 310/156.08 |
| 2010/0079029 | A1 * | 4/2010 | Muller .................... | H02K 1/28 |
| | | | | 310/216.114 |
| 2010/0196174 | A1 * | 8/2010 | Lee ....................... | F04D 25/082 |
| | | | | 417/410.1 |
| 2011/0062819 | A1 | 3/2011 | Lyons et al. | |
| 2011/0074240 | A1 * | 3/2011 | Hiramatsu ......... | H02K 15/0012 |
| | | | | 310/211 |
| 2012/0206008 | A1 * | 8/2012 | Blanc .................. | H02K 1/2773 |
| | | | | 310/156.48 |
| 2012/0248901 | A1 | 10/2012 | Maeda et al. | |
| 2013/0020899 | A1 | 1/2013 | Kleber | |
| 2015/0022044 | A1 * | 1/2015 | Chowdhury ........... | H02K 1/276 |
| | | | | 310/156.53 |

OTHER PUBLICATIONS

"Deep Drawing of Aluminum Alloys: Part One", Total Materia, Jan. 2014.*

International search report, PCT/US2014/039020, Jan. 21, 2015, 9 pages.

* cited by examiner

LIMITING RADIAL EXPANSION IN ROTOR BALANCING

BACKGROUND

Electric motors typically include a rotor mounted on a shaft inside a stator. The rotor can have conducting elements, sometimes called rotor bar, placed along its periphery. The rotor bars can be parallel with the shaft or can be skewed in relation to the shaft. At each end of the rotor an end ring can be connected to the respective ends of the rotor bars, for example as in done in so-called squirrel-cage rotors. The rotor bars and end rings are made from some suitable material, such as copper.

Because rotors will revolve in normal operation, it is important that they be properly balanced before the electric motor can be used. Balancing typically involves spinning the rotor at relatively high speed. This puts a high load on the rotor components. For example, spinning at 16,000 rpm can subject the copper rotor bars to a load on the order of 10 kN. Likewise, the end rings, which can also be made of copper, can be subjected to a high centripetal shear, on the order of 181 MPa.

Loads of these magnitudes can affect the rotor balance. For example, the end ring material (e.g., copper) can expand outward due to the load impacted by the spinning. That is, the outer diameter of the end ring can increase due to the intense rotation, making the end ring larger than initially. As another example, the end ring can shift so that it is no longer coaxial with the rotor shaft, causing the rotor to become unbalanced.

It is sometimes attempted to counteract these and other sources of imbalance by selectively removing small amounts of material from the end rings. After such removal, the rotor is again spun at high speed to determine whether the adjustment was sufficient. However, such additional rotation processes can again introduce some amount of imbalance, as discussed above.

SUMMARY

In a first aspect, a rotor comprises: a shaft; a structure comprising at least one end ring and rotor bars, wherein at least the end ring comprises a material subject to expansion or movement radially outward from the shaft upon a rotor balancing process that involves spinning of the structure; a core that at least partially encloses the rotor bars; and means for limiting the expansion or movement of the structure radially outward.

Implementations can include any or all of the following features. The means comprises a protrusion on one of the structure and the core, and a slot on another of the structure and the core, wherein a gap initially exists between a radially outermost portion of the protrusion and a radially outermost surface of the slot, and wherein the expansion or movement radially outward of the structure is limited when the radially outermost portion of the protrusion contacts the radially outermost surface of the slot. The radially outermost portion of the protrusion has a common curvature with the radially outermost surface of the slot. The means comprises three protrusion-slot pairs spaced equally from each other. The protrusion is on the end ring and the slot is on the core. The core comprises a stack of laminations and the slot comprises an opening through at least an outermost one of the laminations. The core fully encloses the rotor bars within bar slots, wherein the means comprises a group of the rotor bars being positioned in a group of the bar slots that extend less far radially from the shaft than others of the bar slots, and wherein the expansion or movement of the structure radially outward is limited when each of the group of the rotor bars contacts a corresponding one of the group of the bar slots. Each of the group of the rotor bars is identical to remaining rotor bars. The group of the bar slots is three bar slots spaced equally from each other. The material primarily consists of copper and the core primarily consists of steel.

In a second aspect, a method comprises: providing a structure comprising at least one end ring and rotor bars, wherein at least the end ring comprises a material subject to expansion or movement radially outward from the shaft upon spinning of the structure; assembling a rotor from the structure and a core, wherein the core at least partially encloses the rotor bars; spinning the rotor in a rotor balancing process; and limiting the expansion or movement of the structure radially outward in the rotor balancing process.

Implementations can include any or all of the following features. One of the structure and the core comprises a protrusion, and another of the structure and the core rotor comprises a slot, wherein a gap initially exists between a radially outermost portion of the protrusion and a radially outermost surface of the slot, and wherein limiting the expansion or movement of the structure radially outward comprises contacting the radially outermost portion of the protrusion with the radially outermost surface of the slot. The core fully encloses the rotor bars within bar slots, wherein a group of the rotor bars is positioned in a group of the bar slots that extend less far radially from the shaft than others of the bar slots, and wherein limiting the expansion or movement of the structure radially outward comprises each of the group of the rotor bars contacting a corresponding one of the group of the bar slots.

DETAILED DESCRIPTION

This document describes systems and techniques for limiting expansion or movement of a rotor component radially outward in high-rpm rotation performed as part of a rotor balancing process. In some implementations, a protrusion-slot arrangement is used that limits radial expansion or movement of an end ring. In some implementations, a rotor core is provided with some shortened bar slots that serve to limit radially outward movement of the corresponding rotor bars.

Figure 1:
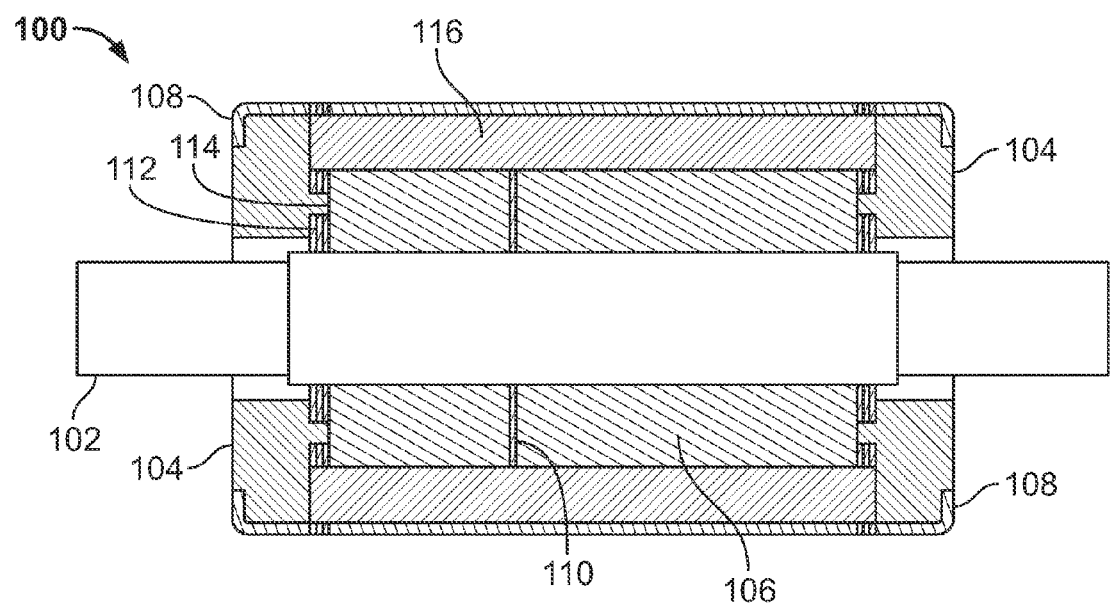
FIG. 1 shows an example cross section of a rotor having a shaft, end rings and a core.

FIG. 1 shows an example cross section of a rotor 100 having a shaft 102, end rings 104 and a core 106. The core and the end rings surround the shaft. The core can have one or more containment rings 108 on the end rings.

The core 106 can be made from a single piece of material or it can be made up of laminations that are assembled into a stack. In some implementations, the inner part of the core can be made of thin laminations 110 (one of which is shown here, for clarity), and one or more thick end laminations 112 at each end of the stack. In this example, the end ring 104 has a protrusion 114 that works together with a corresponding slot (e.g., groove or opening) in the thick end lamination(s) to limit radially outward expansion or movement of the end ring.

The components of the rotor 100 can be assembled using any suitable technique. Rotor bars 116 (e.g., from copper) that are fully or partially enclosed in the core 106 can be brazed or e-beam welded to the end ring(s) 104, to name just two examples.

Figure 2:
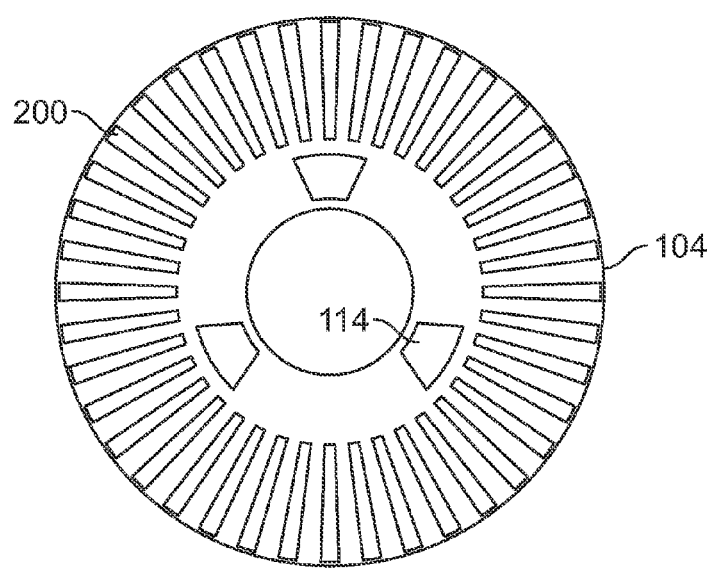
FIG. 2 shows an example of the end ring of the rotor in FIG. 1 having protrusions.

FIG. 2 shows an example of the end ring 104 of the rotor in FIG. 1 having the protrusions 114. The protrusions are raised above the surface of the end ring that faces the laminations. For example, when the end ring is machined or cast, the protrusions can be formed as part of the casting/machining process. As another example, the protrusions can be affixed later, such as by brazing, welding or inserts, and can be made from the same material as the end ring, or from a different material.

In this example, there are three protrusions that are spaced equidistantly from each other around the end ring. In other implementations, more or fewer protrusions can be used. The protrusions serve to limit expansion or movement of the end ring radially outward. The protrusions can be located radially inward from indentations 200 (e.g., grooves or openings) that will receive the respective ends of the rotor bars in assembly. The dimensions of features in this and other illustrations are for purposes of illustrating the example only, and can be different in other implementations.

Figure 3:
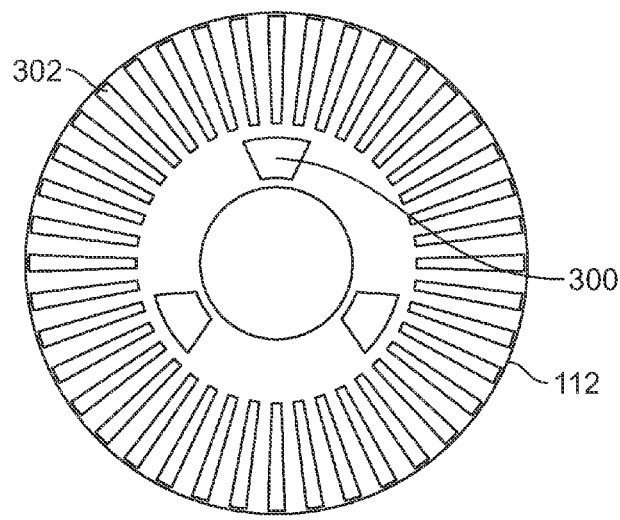
FIG. 3 shows an example of the end lamination of the rotor in FIG. 1 having bar and locating feature slots.

FIG. 3 shows an example of the end lamination 112 of the rotor in FIG. 1 having slots 300. The slots are designed to allow the protrusions to fit therein upon assembly, and to restrict the outward radial movement of the protrusions while the rotor is being spun as part of balancing. By having a minimum of three slots the end ring can be constrained from moving radially since each protrusion limits the radial movement in a specific angle and three of the protrusions fully constrain the end ring from moving radially in any direction. The slots also partially limit the end ring radial expansion.

For example, the slots are openings through the end lamination that can be formed as part of manufacturing (e.g., stamping) the lamination, or that can be formed later (e.g., by punching a hole in the lamination). In some implementations, the slots are indentations or other depressions that do not extend through the entire thickness of the lamination. If multiple end laminations are used, then at least the outer one(s) can have holes that the protrusion extends through.

The end lamination 112 has bar slots 302 through which the respective rotor bars will pass. For example, the outer ends of such rotor bars can be attached to the end rings.

Figure 4A:
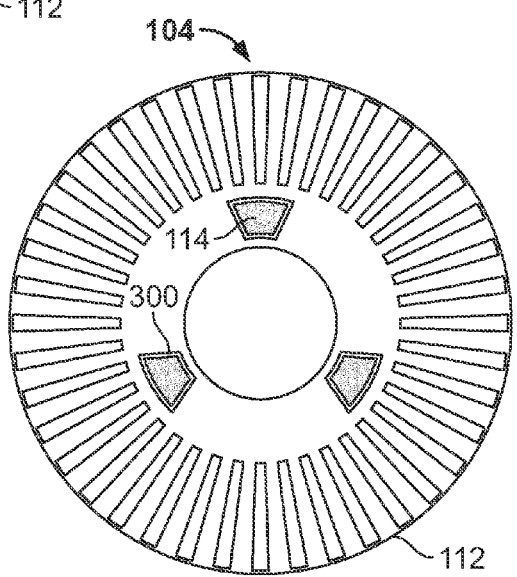
FIG. 4A shows an example of the assembly of end lamination of FIG. 3 and end ring from FIG. 2 before a balancing process.

FIG. 4A shows an example of the end lamination 112 of FIG. 3 before a balancing process. Here, the end ring 104 is located behind the end lamination and is therefore mostly obscured by it. That is, the current view looks at the end lamination from the inside of the rotor toward the end thereof toward the end ring). However, each of the protrusions 114 of the end ring is visible because it protrudes through a corresponding one of the slots 300.

The current example shows the end ring 104 and end lamination 112 before the balancing process (e.g., high-rpm spinning followed by low speed balancing) is performed. The end ring has therefore currently not been moved or expanded radially outward, as can happen during balancing. The protraction is therefore located relatively centrally inside the slot 300. For example, a gap separates the periphery of the protrusion from the inner edge of the slot. During rotation, however, the protrusion can move slightly within the slot due to the expansion/movement of the end ring as a whole, as discussed above.

Figure 4B:
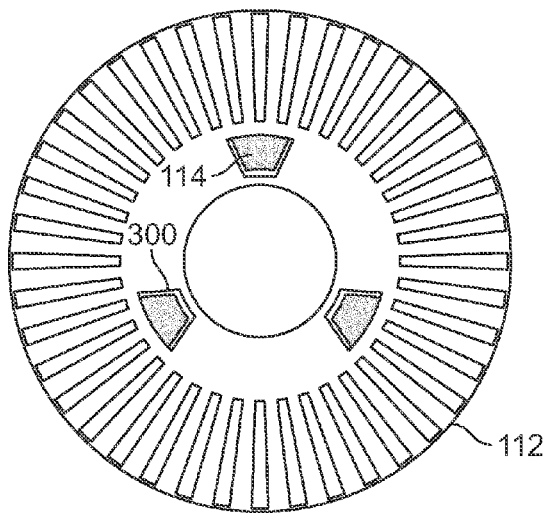
FIG. 4B shows an example of the assembly of end lamination of FIG. 4A and end ring from FIG. 2 after the rotor has being spun to high rpm.

FIG. 4B shows an example of the end lamination of FIG. 4A after the rotor has been spun to high rpm. As a result of spinning the rotor components at high rpm, the end ring has expanded and/or moved radially outward. For example, this is illustrated by the protrusions 114 being dislocated radially outward in the slots 300. Particularly, each of the protrusions now abuts the radially outermost surface of the slot. That is, the protrusion 114 and slot 300 limit expansion or movement of an end ring radially outward. In this example, the radially outermost portion of the protrusion 114 has a common curvature with the radially outermost surface of the slot 300.

Figure 5:
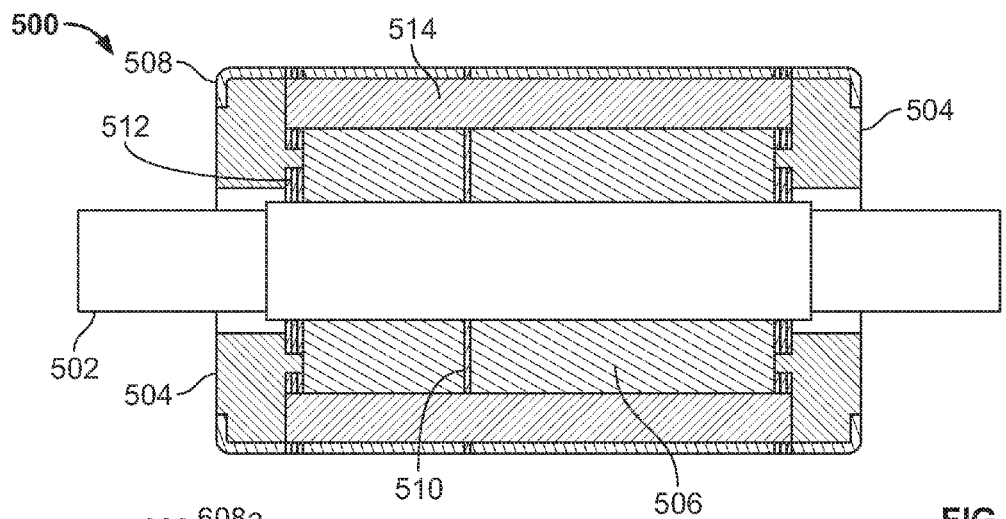
FIG. 5 shows another example cross section of a rotor having a shaft, end rings and a core.

FIG. 5 shows another example cross section of a rotor 500 having a shaft 502, end rings 504 and a core 506. The core and the end rings surround the shaft. The core can have one or more containment rings 508 on the end rings. In some implementations, the inner part of the core can be made of thin laminations 510 (one of which is shown here, for clarity), and one or more thick end laminations 512 at each end of the stack. The core fully encloses rotor bars 514 within bar slots. In this example, some of the bar slots have a different shape than others, to limit expansion or movement of the rotor bars radially outward. Other than that, the components of the rotor can be similar or identical to those of the rotor shown in FIG. 1. Examples of the slots will now be described.

Figure 6A:
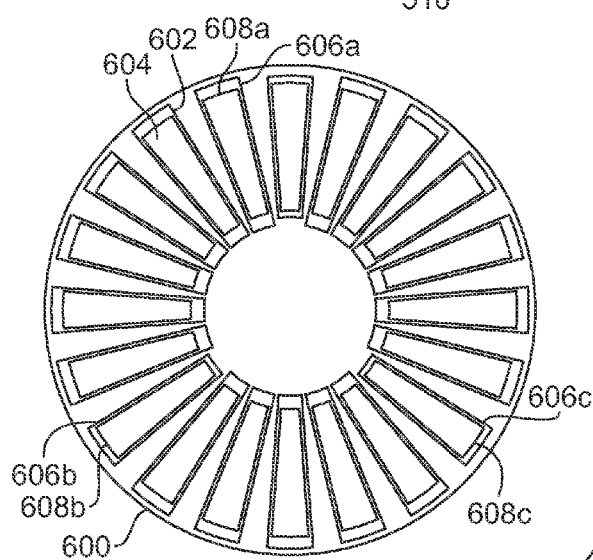
FIG. 6A shows an example of a lamination of FIG. 5 before a balancing process.

FIG. 6A shows an example of a lamination 600 of FIG. 5 before a balancing process. The lamination has multiple bar slots 602 that have a regular size, and a rotor bar 604 is shown in each of the slots. The lamination also has three constraining bar slots 606a-c that each has a corresponding rotor bar 608a-c. The constraining bar slots extend less far radially from a center of the lamination than the bar slots 602. In some implementations, the constraining bar slots can also differ from the bar slots 602 in one or more other ways. For example, the constraining bar slots can extend less far radially toward the center of the lamination, and/or can be narrower. In some implementations, a greater number of bar slots can be used. For example, 74 bar slots can be used.

Figure 6B:
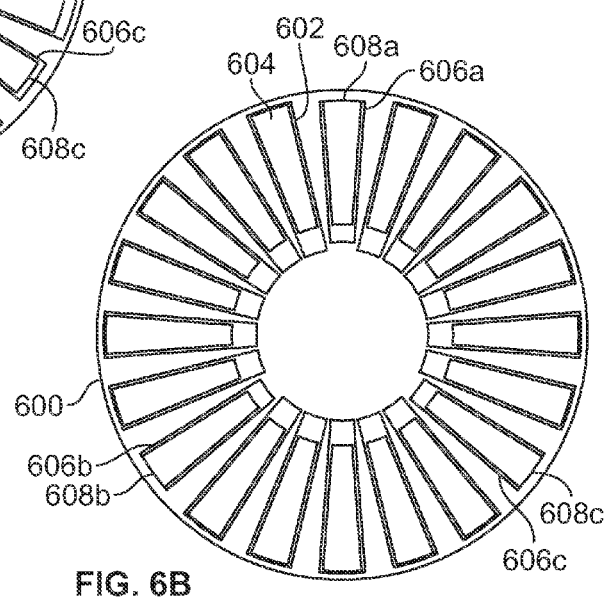
FIG. 6B shows an example of the lamination of FIG. 6A after the balancing process.

FIG. 6B shows an example of the lamination 600 of FIG. 6A after the balancing process. That is, the rotor components have been spun at high rpm and the rotor bars 604 and the rotor bars 608a-c have moved radially outward. For example, the rotor bars may previously have been attached to one or more end rings, which are not shown here for simplicity.

The constraining bar slots 606a-c prevent the rotor bars 608a-c from moving as far radially outward as they could have done in the bar slots 602. That is, the constraining bar slots 606a-c and the rotor bars 608a-c limit expansion or movement of an end ring radially outward. Here, each of the rotor bars 606a-c will expand and/or move radially outward until it contacts the inside edge of the one of the constraining slots in which the rotor bar is located. For example, it is seen that the gap between the rotor bars 608a-c and their corresponding constraining bar slots 606a-c has been narrowed or eliminated in at least one point. By contrast, the rotor bars 604 may not yet have reached the ends of their corresponding bar slots 602. In other words, while the gap between the rotor bars 604 and their bar slots 602 may have been narrowed in at least one point, the gap has not been completely eliminated.

In other implementations, more or fewer constraining bar slots than three can be used. As another example, the rotor bars 608a-c can be identical to, or different from, the rotor bars 604.

A number of implementations have been described as examples. Nevertheless, other implementations are covered by the following dams.

What is claimed is:

1. A rotor comprising:
    a shaft;
    a structure comprising at least one end ring and rotor bars, wherein at least the end ring comprises a material subject to expansion or movement radially outward from the shaft upon a rotor balancing process that involves spinning of the structure;
    a containment ring positioned on the end ring;
    a core that at least partially encloses the rotor bars; and
    a protrusion structure on one of the structure and the core, and a slot structure on another of the structure and the core, wherein a gap initially exists between a radially outermost portion of the protrusion structure and a radially outermost surface of the slot structure, and wherein the expansion or movement radially outward of the structure is limited when the radially outermost portion of the protrusion structure contacts the radially outermost surface of the slot structure.

2. The rotor of claim 1, wherein the radially outermost portion of the protrusion structure has a common curvature with the radially outermost surface of the slot structure.

3. The rotor of claim 2, wherein the protrusion structure and slot structure comprise three protrusion-slot pairs spaced equally from each other.

4. The rotor of claim 3, wherein the protrusion structure is on the end ring and the slot structure is on the core.

5. The rotor of claim 4, wherein the core comprises a stack of laminations and the slot structure comprises an opening through at least an outermost one of the laminations.

6. The rotor of claim 1, wherein the core fully encloses the rotor bars within bar slots, wherein a group of the rotor bars are positioned in a group of the bar slots that extend less far radially from the shaft than others of the bar slots, and wherein the expansion or movement of the structure radially outward is limited when each of the group of the rotor bars contacts a corresponding one of the group of the bar slots.

7. The rotor of claim 6, wherein each of the group of the rotor bars is identical to remaining rotor bars.

8. The rotor of claim 6, wherein the group of the bar slots is three bar slots spaced equally from each other.

9. The rotor of claim 1, wherein the material primarily consists of copper and the core primarily consists of steel.

10. The rotor of claim 2, wherein the radially outermost portion of the protrusion structure extends from one radially extending edge of the protrusion structure to another radially extending edge thereof, and wherein the radially outermost portion of the slot structure extends from one radially extending edge of the slot structure to another radially extending edge thereof.

11. The rotor of claim 10, wherein a radially innermost portion of the protrusion structure has a common curvature with a radially innermost surface of the slot structure.

12. A method comprising:
    providing a structure comprising at least one end ring and rotor bars, wherein at least the end ring comprises a material subject to expansion or movement radially outward from the shaft upon spinning of the structure;
    assembling a rotor from a shaft, the structure and a core, wherein the core at least partially encloses the rotor bars and wherein a containment ring is positioned on the end ring, wherein one of the structure and the core comprises a protrusion structure, and another of the structure and the core rotor comprises a slot structure, wherein a gap initially exists between a radially outermost portion of the protrusion structure and a radially outermost surface of the slot structure;
    spinning the rotor in a rotor balancing process; and
    limiting the expansion or movement of the structure radially outward in the rotor balancing process by contacting the radially outermost portion of the protrusion structure with the radially outermost surface of the slot structure.

13. The method of claim 12, wherein the core fully encloses the rotor bars within bar slots, wherein a group of the rotor bars is positioned in a group of the bar slots that extend less far radially from the shaft than others of the bar slots, and wherein limiting the expansion or movement of the structure radially outward further comprises each of the group of the rotor bars contacting a corresponding one of the group of the bar slots.

14. A rotor comprising:
    a shaft;
    a structure attached to the shaft, the structure comprising:
        a plurality of rotor bars;
        a core that at least partially encloses the plurality of rotor bars;
        an end ring; and
        a containment ring positioned on the end ring, wherein at least the end ring comprises a material subject to expansion or movement radially outward from the shaft upon a rotor balancing process that involves spinning of the structure; and
    a protrusion structure on one of the end ring and the core, and a slot structure on another of the end ring and the core, wherein a gap initially exists between a radially outermost portion of the protrusion structure and a radially outermost surface of the slot structure, and wherein the expansion or movement radially outward of the structure is limited when the radially outermost portion of the protrusion structure contacts the radially outermost surface of the slot structure.

15. The rotor of claim 14, wherein the radially outermost portion of the protrusion structure has a common curvature with the radially outermost surface of the slot structure.

16. The rotor of claim 15, wherein the protrusion structure and slot structure comprise three protrusion-slot pairs spaced equally from each other.

17. The rotor of claim 16, wherein the protrusion structure is on the end ring and the slot structure is on the core.

18. The rotor of claim 14, wherein the core fully encloses the rotor bars within bar slots, wherein a group of the rotor bars are positioned in a group of the bar slots that extend less far radially from the shaft than others of the bar slots, and wherein the expansion or movement of the structure radially outward is limited when each of the group of the rotor bars contacts a corresponding one of the group of the bar slots.

19. The rotor of claim 18, wherein each of the group of the rotor bars is identical to remaining rotor bars.

20. The rotor of claim 18, wherein the group of the bar slots is three bar slots spaced equally from each other.

* * * * *